May 14, 1963

C. KIMBLETON 3,089,997

CAPACITANCE TUNING CIRCUIT FOR VARIABLE
SPEED ALTERNATOR CURRENT CONTROL

Filed May 14, 1962

INVENTOR.

Cecil Kimbleton

BY

Dale A. Winnie

ATTORNEY

3,089,997
CAPACITANCE TUNING CIRCUIT FOR VARIABLE SPEED ALTERNATOR CURRENT CONTROL

Cecil Kimbleton, Livonia, Mich., assignor to Curtiss-Wright Corporation, Utica, Mich., a corporation of Delaware
Filed May 14, 1962, Ser. No. 194,342
5 Claims. (Cl. 322—95)

This invention relates to alternator generators and more particularly to means for increasing the output current of alternators required to operate at variable speeds.

The output current of an alternator generator can be substantially increased in the lower speed ranges of operation by the use of more capacitance. However, unless the capacitance is reduced as the alternator passes out of the lower speed range, the alternator output will not reach as high a level as it would with less capacitance in the output circuit and will start to drop off sooner than is desirable.

It is an object of this invention to provide means for having a higher tuning capacitance in the output circuit of an alternator generator at lower operating speeds and for reducing such tuning capacitance at higher operating speeds.

It is also an object of this invention to provide means for automatically reducing the capacitance in the output circuit of an alternator generator as the speed of operation increases and to regain full capacitance at an alternator speed which is just slightly lower than the operating speed at which the capacitance was first reduced.

Another object of this invention is to provide means whereby the change-over point from a higher to a lower capacitance, and vice versa, may be adjusted to suit operating conditions.

These and other objects and advantages to be gained in the practice of this invention will be more apparent after reading the following specification and studying the accompanying drawing relating to a preferred embodiment of the invention.

Figure 1:
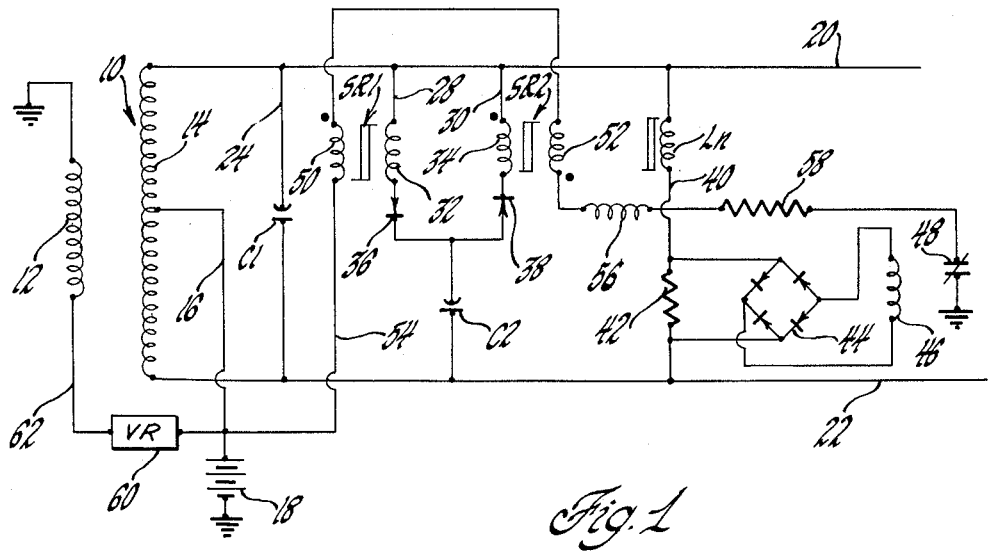
FIGURE 1 is a schematic illustration of the automatic tuning capacitance circuitry of this invention.

Alternator generator 10 is shown schematically by FIGURE 1 to include a field winding 12 and output winding 14.

The output winding 14 of the alternator is center tapped by lead 16 to ground, through the storage battery 18.

The output leads 20 and 22 of the winding 14 have a capacitor C1 in shunt thereacross within line 24.

A second capacitor C2 is also provided across the output leads 20 and 22 and in parallel with the capacitor C1. The capacitor C2 is provided in line 26 connected to the output lead 22 and to a pair of magnetic amplifiers SR1 and SR2 within parallel lines 28 and 30 which are connected separately to the output lead 20 through their core saturating windings 32 and 34.

Diode rectifiers 36 and 38 are provided in the core winding leads 28 and 30, respectively, as shown.

A non-linear inductor $L_n$ is provided between the output leads 20 and 22 within a line 40 including a resistor 42. A full wave rectifier bridge 44 is provided across the resistor 42 and is operative of a solenoid coil 46 for a normally closed contact relay 48 in circuit with the control windings 50 and 52 of the mag. amps. SR1 and SR2.

The control winding circuit for the mag. amps. SR1 and SR2 includes lead 54 connected to the center-tap leads 16 of the output winding, above the storage battery 18, and having an air core inductor 56 and a resistor 58 in series for control winding adjustment purposes.

A voltage regulator 60 is provided in the field coil line 62 and, in the present instance, is shown as having a common connection with the mag. amp. control winding lead 54.

For purposes of illustration, the capacitor C1 is considered to have a rating of 12 microfarads and the capacitor C2 a rating of 26 microfarads. The resistor 42 provides 25 ohms resistance in the inductor leg 40.

Figure 2:
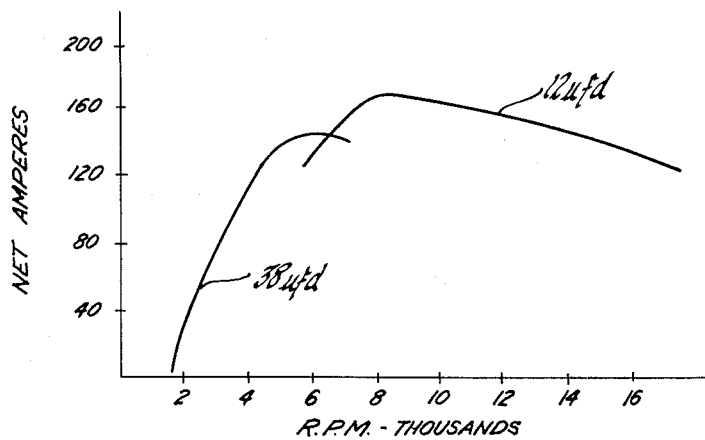
FIGURE 2 is a graphic representation of the tuning capacitance curves showing the output current to alternator speed relations.

With reference to the curves of FIGURE 2, it will be noted that the alternator output current is substantially increased in the lower speed range by the use of the full capacitance which is available. However, the alternator output drops off at approximately 6000 r.p.m. and it becomes apparent that the tuning capacitance should be reduced somewhere in this range to obtain a higher output at the higher operating speeds.

By dropping out the capacitor C2 the higher peaking curve of FIGURE 2 will be obtained and this is accomplished in the manner which will now be described.

Referring back to FIGURE 1, the magnetic amplifiers SR1 and SR2 are shown as arranged in the circuit of capacitor C2 to allow current flow when their respective control windings 50 and 52 are not energized.

The mag. amp. SR1 has the rectifier 36 in series with its power winding 32 to pass current in one direction and the mag. amp. SR2 has the rectifier 38 in series with its power winding 34 to pass current in the other direction. Accordingly, current will pass through the power windings of the respective mag. amps. on alternate half cycle wave pulses and the unidirectional half wave pulses will be effective in saturating the core of the mag. amps. The higher residual flux of the cores when saturated reduces the impedance to current flow and enables alternating current to be carried to the capacitor C2 which is then effective each half cycle as a parallel tuning capacitance with the capacitor C1.

When the control windings 50 and 52 of the mag. amps. SR1 and SR2 are energized, the magnitude of the control signal is sufficient to reverse the flux of the mag. amp. cores beyond the volt-second integral of the half cycle pulses through the power windings for complete recovery. Accordingly, there is a high impedance to current flow to capacitor C2 and only a relatively low magnetizing current passes. This current is so low that C2 is no longer effective as a parallel tuning capacitance.

The control windings 50 and 52 are effective when the normally closed contact relay 48 is opened and control signal current is cut-off. This is accomplished by means of the inductor $L_n$ which regulates the voltage drop across resistor 42. The voltage drop across resistor 42 in turn controls the effectiveness of coil 46 in holding open the contact relay 48.

The inductor $L_n$ includes a toroidal core of square loop material which has the inherent property of requiring a definite volt-second integral on a half cycle basis before abrupt saturation and a change over from a high impedance to a low impedance to current flow therethrough. With such a non-linear inductor, the volt-second integral necessary to cause saturation and reduce impedance is directly related to frequency and in turn to alternator speed. If the voltage level of the alternator is held relatively constant, and the frequency is increased, the volt-second integral for saturation will occur later in the half cycle. Conversely, at lower frequencies the volt-second integral for saturation will occur earlier.

Accordingly, by the proper selection of the inductor $L_n$ the changeover point of the inductor may be set to occur early enough in the low frequency speed ranges to impose a sufficient voltage drop across the resistor 42 to activate the coil 46, hold open the contact relay 48, and prevent control signal current to the mag. amps. SR1 and SR2. This enables current flow to capacitor C2 and it is effective in the system as a parallel tuning capacitance with capacitor C1.

As the alternator speed increases, and the frequency goes up, the volt-second integral for reduction of the impedance of $L_n$ occurs later in the half cycle, resistor 42 receives less voltage, and the contact relay 48 closes. With the contact relay 48 closed there is a control signal to the control windings 50 and 52 of the mag. amps. SR1 and SR2 and the capacitor C2 is removed from the system.

By the use of the proper number of turns of square loop core material in the non-linear inductor the 26 mfd. capacitor C2 may be made ineffective at say 7000 r.p.m. and made to become effective again when alternator speed is reduced to 6700 r.p.m. It will be appreciated that this provides a most beneficial and effective automatic change-over system for parallel tuned high frequency alternators.

I claim:

1. A parallel tuning capacitance circuit for variable speed alternator current control, and comprising: a pair of capacitors provided in parallel across the output leads of a variable speed alternator generator, control means provided in series with one of said capacitors across said output leads, and a non-linear inductor provided across said output leads in parallel with said capacitors and operatively connected to said control means for effectively removing said one capacitor at preselected alternator generator speeds of operation.

2. A parallel tuning capacitance circuit for variable speed alternator generators, and comprising: a pair of capacitors provided in parallel across the output leads of a variable speed alternator generator, magnetic amplifier means having the power windings thereof connected in series with one of said capacitors and receptive of unidirectional half wave pulses therethrough, a control signal source connected to the control windings of said magnetic amplifier means, and alternator speed sensing means provided in series with said control signal source and responsive to a preselected alternator speed for inactivation of said control signal source.

3. The parallel tuning capacitance circuit of claim 2: said control signal source being of sufficient magnitude to reverse the magnetic amplifier core flux beyond the volt-second integral necessary for complete recovery due to current flow through said power windings.

4. The parallel tuning capacitance circuit of claim 2: said alternator speed sensing means including a non-linear inductor provided across the output leads of said alternator and operatively interconnected with said control signal source.

5. A parallel tuning capacitance circuit for variable speed alternator current control, and comprising: a first capacitance received across the output leads of a variable speed alternator, a second capacitance received across the output leads of said alternator and in series with said first capacitance, a pair of magnetic amplifiers having the power windings thereof each connected in series with said second capacitance across said alternator output leads, rectifier means connected in series with said magnetic amplifier power windings and each conductive of current flow in opposite directions, a non-linear inductor and a resistor connected in series across said alternator output leads, a control signal source connected to the control windings of said magnetic amplifiers and including a contact relay in series therewith, and means provided across said resistor and operative of said contact relay for inactivation thereof at reduced alternator speeds.

No references cited.